US011995150B2

United States Patent
Gudovskiy et al.

(10) Patent No.: US 11,995,150 B2
(45) Date of Patent: May 28, 2024

(54) INFORMATION PROCESSING METHOD AND INFORMATION PROCESSING SYSTEM

(71) Applicant: Panasonic Intellectual Property Corporation of America, Torrance, CA (US)

(72) Inventors: Denis Gudovskiy, Emeryville, CA (US); Alec Hodgkinson, Pescadero, CA (US); Takuya Yamaguchi, Osaka (JP); Sotaro Tsukizawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 443 days.

(21) Appl. No.: 17/234,127

(22) Filed: Apr. 19, 2021

(65) Prior Publication Data

US 2021/0241021 A1 Aug. 5, 2021

Related U.S. Application Data

(63) Continuation of application No. PCT/JP2019/045997, filed on Nov. 25, 2019.
(Continued)

(30) Foreign Application Priority Data

Sep. 9, 2019 (JP) ................. 2019-164054

(51) Int. Cl.
*G06F 18/214* (2023.01)
*G06N 5/04* (2023.01)
*G06N 20/00* (2019.01)

(52) U.S. Cl.
CPC ............. *G06F 18/214* (2023.01); *G06N 5/04* (2013.01); *G06N 20/00* (2019.01)

(58) Field of Classification Search
CPC .......... G06N 5/04; G06N 20/00; G06N 3/045; G06N 3/08; G06F 18/214
(Continued)

(56) References Cited

U.S. PATENT DOCUMENTS 9,367,819 B2 * 6/2016 Nicholson ................ G06N 7/01
11,200,461 B2 * 12/2021 Rajarathinam ........ G06N 3/084
(Continued)

FOREIGN PATENT DOCUMENTS

| JP | 2017-224184 | 12/2017 | |
|---|---|---|---|
| WO | WO-2018002953 A1 * | 1/2018 | ........... G06N 3/0427 |
| WO | WO-2018179765 A1 * | 10/2018 | ............. G06F 21/16 |

OTHER PUBLICATIONS

International Search Report issued Feb. 10, 2020 in International (PCT) Application No. PCT/JP2019/045997.
(Continued)

*Primary Examiner* — Matthew C Bella
*Assistant Examiner* — Pardis Sohraby
(74) *Attorney, Agent, or Firm* — Wenderoth, Lind & Ponack, L.L.P.

(57) ABSTRACT

An information processing method implemented by a computer includes: obtaining a piece of first data, and a piece of second data not included in a training dataset for training an inferencer; calculating, using a piece of first relevant data obtained by inputting the first data to the inferencer trained by machine learning using the training dataset, a first contribution representing contributions of portions constituting the first data to a piece of first output data output by inputting the first data to the inferencer; calculating, using a piece of second relevant data obtained by inputting the second data to the inferencer, a second contribution representing contributions of portions constituting the second data to a piece of second output data output by inputting the second data to the
(Continued)

inferencer; and determining whether to add the second data to the training dataset, according to the similarity between the first and second contributions.

9 Claims, 8 Drawing Sheets

Related U.S. Application Data

(60) Provisional application No. 62/818,144, filed on Mar. 14, 2019.

(58) Field of Classification Search
USPC .......................................................... 382/159
See application file for complete search history.

(56) References Cited

U.S. PATENT DOCUMENTS

| | | | |
|---|---|---|---|
| 11,373,257 B1* | 6/2022 | Guo .................. | G06N 20/00 |
| 2014/0304197 A1* | 10/2014 | Jaiswal .............. | G06F 21/6209 |
| | | | 706/12 |
| 2018/0060723 A1* | 3/2018 | Nakano ................ | G06N 3/045 |
| 2018/0336481 A1* | 11/2018 | Guttmann ............. | G06N 3/045 |
| 2019/0251471 A1 | 8/2019 | Morita et al. | |
| 2020/0151578 A1* | 5/2020 | Chen .................. | G06N 20/00 |
| 2020/0320440 A1* | 10/2020 | Ashani ................. | G06N 20/20 |

OTHER PUBLICATIONS

Extended European Search Report issued Apr. 7, 2022 in corresponding European Patent Application No. 19918828.5.

\* cited by examiner (a)
| | Image P | Image Q | Image R | Image S |
|---|---|---|---|---|
| Degree of similarity | 6 | 7 | 5 | 1 |

(b)
| | Image P | Image Q | Image R | Image S |
|---|---|---|---|---|
| Degree of priority | 2 | 1 | 3 | 4 |

FIG. 8

|  |  | Image P | Image Q | Image R | Image S |
|---|---|---|---|---|---|
| Falsely recognized data | A | 6 | 7 | 5 | 1 |
|  | B | 2 | 2 | 3 | 4 |
|  | C | 1 | 3 | 1 | 3 |
| Representative value in terms of degree of similarity | | 6 | 7 | 5 | 4 |

FIG. 9

|  |  | Image P | Image Q | Image R | Image S |
|---|---|---|---|---|---|
| Falsely recognized data | A | 6 | 7 | N/A | N/A |
|  | B | N/A | N/A | 3 | 4 |
|  | C | N/A | 3 | N/A | 3 |
| Representative value in terms of degree of similarity | | 6 | 7 | 3 | 4 |

INFORMATION PROCESSING METHOD AND INFORMATION PROCESSING SYSTEM

CROSS REFERENCE TO RELATED APPLICATIONS

This is a continuation application of PCT International Application No. PCT/JP2019/045997 filed on Nov. 25, 2019, designating the United States of America, which is based on and claims priority of U.S. Provisional Patent Application No. 62/818,144 filed on Mar. 14, 2019 and Japanese Patent Application No. 2019-164054 filed on Sep. 9, 2019. The entire disclosures of the above-identified applications, including the specifications, drawings and claims are incorporated herein by reference in their entirety.

FIELD

The present disclosure relates to an information processing method and an information processing system.

BACKGROUND

In image identification processing using machine learning, a known technique (see Patent Literature 1 (PTL1)) improves the accuracy of identification of an image by adding, to a training dataset, an image whose amount of image features has a low degree of similarity to that of an existing learning image.

It should be noted that the identification processing is also referred to as inference processing. The inference processing includes detection processing as well as the identification processing.

CITATION LIST

Patent Literature

PTL 1: Japanese Unexamined Patent Application Publication No. 2017-224184

SUMMARY

Technical Problem

However, in a conventional technique as disclosed in PTL 1, the accuracy of inference may not be much improved, depending on the inferencer. In other words, learning efficiency may not be high, which is considered an issue.

In view of the foregoing, the present disclosure provides, for example, an information processing method capable of efficiently improving the accuracy of inference by an inferencer.

Solution to Problem

An information processing method according to an aspect of the present disclosure is an information processing method implemented by a computer. The information processing method that includes: obtaining a piece of first data and a piece of second data, the piece of second data being not included in a training dataset used for training an inferencer; calculating, by using a piece of first relevant data, a first contribution representing the respective contributions of portions constituting the piece of first data to a piece of first output data output by inputting the piece of first data to the inferencer, the piece of first relevant data being obtained by inputting the piece of first data to the inferencer trained by machine learning using the training dataset; calculating, by using a piece of second relevant data, a second contribution representing the respective contributions of portions constituting the piece of second data to a piece of second output data output by inputting the piece of second data to the inferencer, the piece of second relevant data being obtained by inputting the piece of second data to the inferencer; and determining whether to add the piece of second data to the training dataset for the inferencer, according to the degree of similarity between the first contribution and the second contribution.

It should be noted that a comprehensive or specific embodiment may be a system, apparatus, integrated circuit, computer program, or computer-readable recording medium, such as CD-ROM, or may be a given combination of the system, apparatus, integrated circuit, computer program, and recording medium.

Advantageous Effects

The information processing method according to the present disclosure is capable of efficiently improving the accuracy of inference by the inferencer.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 illustrates an example of a training dataset used for machine learning training to generate a model.

FIG. 3 illustrates an example of the results of recognition by the recognizer.

FIG. 8 illustrates a second example of the additional data determination method implemented by the determination unit in Embodiment.

FIG. 9 illustrates a third example of the additional data determination method implemented by the determination unit in Embodiment.

Figure 1:
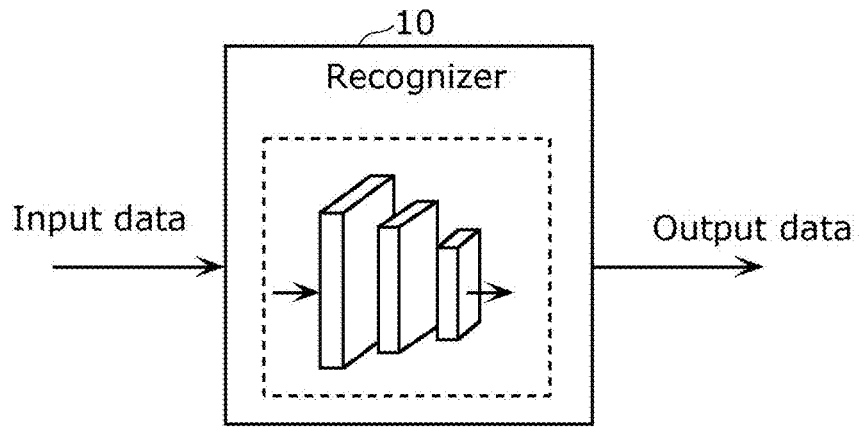
FIG. 1 is a conceptual diagram illustrating processing performed by a recognizer.

DESCRIPTION OF EMBODIMENTS (Underlying Knowledge Forming Basis of the Present Disclosure)

Regarding the inference processing described in Background, the inventors of the present invention found the following issues.

Enhancing a training dataset is useful to improve the performance of an inferencer that performs the inference processing using machine learning. Each piece of training data includes an image and a label that is information shown by the image. Typically, to enhance a training dataset, a new training dataset is used that includes newly added pieces of data not included in a training dataset used for training an inferencer. To add new pieces of data, given images need to be labeled. Labeling is performed by, for example, a person.

While the given images can be readily prepared, it is difficult at present to determine which data among such given images are useful to improve the accuracy of inference by the inferencer or correct a false inference made by the inferencer. Thus, to improve the accuracy of inference or correct a false inference, a vast amount of new data is added regardless of whether images can contribute to improvement in the accuracy of inference or correction of the false inference. However, to generate and add a vast amount of data, for instance, a large number of images need to be labeled, which is considered inefficient in terms of the number of steps or a period of time to be taken.

Thus, at present, the efficiency of improvement in the accuracy of inference by the inferencer is not high, which is considered an issue.

In response to the issue, in a conventional technique described as above, images having low degrees of similarity in terms of the amount of image features are selected as training data.

However, the images having low degrees of similarity in terms of the amount of image features are not necessarily useful pieces of data for an inferencer to be trained using the images. Thus, the accuracy of inference may not be much improved, depending on the inferencer. In other words, learning efficiency may still not be high, which is considered an issue.

In view of the foregoing, the present disclosure provides, for example, an information processing method capable of efficiently improving the accuracy of inference by an inferencer.

An information processing method according to an aspect of the present disclosure is an information processing method implemented by a computer. The information processing method that includes: obtaining a piece of first data and a piece of second data, the piece of second data being not included in a training dataset used for training an inferencer; calculating, by using a piece of first relevant data, a first contribution representing the respective contributions of portions constituting the piece of first data to a piece of first output data output by inputting the piece of first data to the inferencer, the piece of first relevant data being obtained by inputting the piece of first data to the inferencer trained by machine learning using the training dataset; calculating, by using a piece of second relevant data, a second contribution representing the respective contributions of portions constituting the piece of second data to a piece of second output data output by inputting the piece of second data to the inferencer, the piece of second relevant data being obtained by inputting the piece of second data to the inferencer; and determining whether to add the piece of second data to the training dataset for the inferencer, according to the degree of similarity between the first contribution and the second contribution.

According to the above-described aspect, it is determined that a piece of second data having a contribution similar to that of a piece of first data will be added to the training dataset. The contribution represents an effect on the result of inference (processing performed) by the inferencer. Thus, a piece of second data similar to a piece of first data in terms of the effect on the result of inference by the inferencer can be selected. By training the inferencer by using the selected piece of second data as a piece of training data, it is more likely to suppress the inferencer from making a false inference for the piece of first data and pieces of data similar to the piece of first data. In addition, by adding a piece of data useful for the inferencer to the training dataset, it is possible to avoid randomly adding a vast amount of data. Hence, according to the above-described aspect, the accuracy of inference by the inferencer can be efficiently improved.

For instance, the piece of first data may be a piece of data for which the inferencer made a false inference.

According to the above-described aspect, it is determined that a piece of second data having a contribution similar to that of a piece of falsely inferred data will be added to the training dataset. By training the inferencer by using a training dataset to which the piece of second data has been added in accordance with the determination, it is possible to suppress the inferencer from making another false inference for pieces of data similar to the piece of falsely inferred data. Hence, according to the above-described aspect, the accuracy of inference by the inferencer can be efficiently improved.

For instance, if a determination to add the piece of second data is made, the inferencer may be trained using the training dataset to which the piece of second data has been added, the training dataset being used for training the inferencer.

According to the above-described aspect, the inferencer is trained using the training dataset to which the piece of second data has been added in accordance with the determination to add the piece of second data to the training dataset. This makes it possible to suppress the inferencer from making another false inference for pieces of data similar to the piece of first data. Hence, according to the above-described aspect, the accuracy of inference by the inferencer can be efficiently improved.

For instance, regarding the determination of whether to add the piece of second data to the training dataset for the inferencer, whether to add to the training dataset for the inferencer is determined for each of pieces of second data to enable a piece of second data having a higher degree of similarity between the first contribution and the second contribution to be more preferentially selected from the pieces of second data and added to the training dataset for the inferencer, the pieces of second data each being the piece of second data.

According to the above-described aspect, the following determination can be made: a piece of second data more similar to the piece of first data in terms of the contribution is selected from the prepared pieces of second data, and the selected piece of second data is added to the training dataset. Hence, according to the above-described aspect, the accuracy of inference by the inferencer can be more efficiently improved.

For instance, regarding the determination of whether to add the piece of second data to the training dataset for the inferencer, a plurality of the first contributions that include the first contribution of each of pieces of first data may be calculated, the pieces of first data each being the piece of first data, and whether to add the piece of second data to the training dataset for the inferencer may be determined according to a representative value calculated using a plurality of degrees of similarity including degrees of similarity between the plurality of the first contributions and the second contribution.

According to the above-described aspect, if pieces of first data are present, a piece of second data to be added to the training dataset is determined using representative values calculated from the degrees of similarity calculated for each of the pieces of first data. If pieces of first data are present, a plurality of degrees of similarity are calculated. However, it is difficult to determine, by using the plurality of degrees of similarity, which piece of second data should be added to the training dataset. Thus, by using the representative values calculated from the plurality of degrees of similarity, it is possible to readily determine which piece of second data should be added to the training dataset. Hence, according to the above-described aspect, the accuracy of inference by the inferencer can be more readily improved.

For instance, the plurality of degrees of similarity may include degrees of similarity between the plurality of the first contributions and a plurality of the second contributions that include the second contribution of each of pieces of second data, the pieces of second data each being the piece of second data. Regarding calculation of the representative value, for each of the pieces of first data, a predetermined number of degrees of similarity may be selected from the plurality of degrees of similarity, and for each of the pieces of second data, the representative value may be calculated by using the predetermined number of degrees of similarity. Regarding the determination of whether to add the piece of second data to the training dataset for the inferencer, whether to add the piece of second data to the training dataset for the inferencer may be determined according to the representative values.

According to the above-described aspect, if pieces of first data are present, it is possible to suppress the determination that pieces of second data similar exclusively to a specific piece of first data in terms of the contribution will be added to the training dataset, from being made. If pieces of first data are present, in some cases, it is determined that pieces of second data similar exclusively to a specific piece of first data in terms of the contribution will be added to the training dataset. In this case, while it is possible to suppress the inferencer from making another false inference for pieces of data similar to the specific piece of first data, it may not be possible to suppress the inferencer from making another false inference for the pieces of first data other than the specific piece of first data among the pieces of first data. Thus, it may not be possible to suppress the inferencer from making a false inference, evenly among the pieces of first data. According to the above-described aspect, however, it is possible to suppress the inferencer from making a false inference, evenly among the pieces of first data. Hence, according to the above-described aspect, the accuracy of inference by the inferencer can be efficiently improved, and improvements can be made evenly among the pieces of first data.

For instance, the inferencer may be an identifier or a detector. According to the above-described aspect, it is possible to suppress false identification in identification processing performed by the identifier or false detection in detection processing performed by the detector. Hence, according to the above-described aspect, the accuracy of identification by the identifier or the accuracy of detection by the detector can be efficiently improved.

For instance, each of the piece of first data and the piece of second data may be a piece of sensing data.

According to the above-described aspect, it is possible to efficiently improve the accuracy of inference for the piece of sensing data.

For instance, the piece of first relevant data may be the piece of first output data, and the piece of second relevant data may be the piece of second output data.

According to the above-described aspect, efficient improvement in the accuracy of inference by the inferencer can be more readily made by using the piece of first output data as the piece of first relevant data.

For instance, a presentation apparatus may present information indicating the piece of second data determined to be added to the training dataset for the inferencer.

According to the above-described aspect, information indicating the piece of second data determined to be added to the training dataset is presented. The presentation apparatus presents the piece of second data to a user according to the information and receives, from the user, a label regarding the information indicating the piece of second data. The piece of data is added to the training dataset by using the input label. Hence, by receiving, from the user, the label for the piece of data to be added, the accuracy of inference by the inferencer can be more efficiently improved.

In addition, an information processing system according to another aspect of the present disclosure, includes: an acquisition unit that obtains a piece of first data and a piece of second data, the piece of second data being not included in a training dataset used for training an inferencer; a computation unit (a) that calculates, by using a piece of first relevant data, a first contribution representing the respective contributions of portions constituting the piece of first data to a piece of first output data output by inputting the piece of first data to the inferencer, the piece of first relevant data being obtained by inputting the piece of first data to the inferencer trained by machine training using the training dataset and (b) that calculates, by using a piece of second relevant data, a second contribution representing the respective contributions of portions constituting the piece of second data to a piece of second output data output by inputting the piece of second data to the inferencer, the piece of second relevant data being obtained by inputting the piece of second data to the inferencer; and a determination unit that determines whether to add the piece of second data to the training dataset for the inferencer, according to the degree of similarity between the first contribution and the second contribution.

The above-described aspect provides effects similar to those obtained by implementing the information processing method set forth above.

It should be noted that a comprehensive or specific embodiment may be a system, apparatus, integrated circuit, computer program, or computer-readable recording medium, such as CD-ROM, or may be a given combination of the system, apparatus, integrated circuit, computer program, and recording medium.

Hereinafter, Embodiment is described in detail with reference to the drawings.

It should be noted that Embodiment described below is a comprehensive or specific example. The numerical values, shapes, materials, structural elements, arrangements and connections of the structural elements, steps, and order of the steps, and others described in Embodiment set forth below are provided as examples and are not intended to limit the present disclosure. Moreover, among the structural elements described in Embodiment set forth below, the structural elements not included in the independent claims, which represent superordinate concepts, are described as optional structural elements.

EMBODIMENT

In Embodiment, for instance, an information processing system and an information processing method are described that enable efficient improvement in the accuracy of inference by an inferencer.

The overview of operation of recognizer 10 is described with reference to FIGS. 1 to 3.

FIG. 1 is a conceptual diagram illustrating processing performed by recognizer 10.

As illustrated in FIG. 1, when receiving a piece of input data, recognizer 10 performs recognition processing for the piece of input data and outputs the result of the recognition processing as a piece of output data. Here, as an example, the piece of input data is an image. However, instead of image, sound or text may be used as the piece of input data. If the piece of input data is an image, what is shown in the image (piece of input data) is recognized in the recognition processing.

It should be noted that recognizer 10 is an example of an inferencer. Another example of the inferencer is a detector. When receiving a piece of input data, the detector performs detection processing for the piece of input data and outputs the result of the detection processing as a piece of output data. If the piece of input data is an image, for instance, a specific subject shown in the image (piece of input data) is detected in the detection processing.

The piece of input data is a piece of image data to be recognized by recognizer 10.

Recognizer 10 is a recognition model generated by machine learning training and is used for performing the recognition processing. Recognizer 10 has internal parameters and is trained and generated by setting an appropriate parameter so that an appropriate piece of output data is output in response to a piece of input data. Recognizer 10 is, for example, a mathematical model in a neural network. More specifically, a recognition model suitable for an object detection method, such as single shot multibox detector (SSD), faster region-based convolutional neural network (Faster-RCNN), or you only look once (YOLO), may be used as recognizer 10.

The piece of output data is output by recognizer 10 and shows the result of recognition by recognizer 10. Specifically, the piece of output data shows what is shown in the image, which is the piece of input data.

FIG. 2 illustrates an example of a training dataset used for machine learning training to generate recognizer 10. Here, as an example, recognizer 10 obtains images showing 10 numbers from 0 to 9 as pieces of input data, recognizes a number shown in each image, and outputs the results of recognition.

As illustrated in FIG. 2, the training dataset includes image-label pairs.

Each of the images included in the training dataset shows one of 10 numbers from 0 to 9. The training dataset includes images in which each number is drawn in various patterns. For instance, thousands to tens of thousands of images are included for each number.

One label is appended to each image paired with the label and indicates the number shown in the image.

Recognizer 10 is generated by machining learning using the training dataset illustrated in FIG. 2. Specifically, recognizer 10 is generated by adjusting the internal parameters so that when an image included in the training dataset is input as a piece of input data, the numerical value of a label paired with the input image is output.

FIG. 3 illustrates an example of the results of recognition by recognizer 10. FIG. 3 illustrates an example of pieces of output data output by recognizer 10 that has received pieces of input data.

According to FIG. 3, when, for instance, piece of input data 1 in FIG. 3 (i.e., image showing the number 5) was input, recognizer outputted the number 5 as a piece of output data. According to FIG. 3, when piece of input data 2 in FIG. 3 (i.e., image showing the number 1) was input, recognizer 10 outputted the number 1 as a piece of output data.

In both cases, recognizer 10 outputted the number shown in the input image. This means that recognition by recognizer 10 was true.

Meanwhile, according to FIG. 3, when, for instance, piece of input data 3 in FIG. 3 (i.e., image showing the number 4) was input, recognizer 10 outputted the number 7 as a piece of output data. According to FIG. 3, when piece of input data 4 in FIG. 3 (i.e., image showing the number 1) was input, recognizer 10 outputted the number 9 as a piece of output data.

In both cases, recognizer 10 outputted a number different from the number shown in the input image. This means that recognition by recognizer 10 was false.

When it turns out that recognizer 10 made false recognition, processing will be performed to prevent recognizer 10 from making such false recognition. Enhancing the training dataset is useful to prevent recognizer 10 from making such false recognition. To enhance the training dataset, a new training dataset that includes newly added pieces of data not included in the training dataset used for training recognizer 10 is used. Then, recognizer 10 is generated using the new training dataset.

However, it is difficult to determine which new piece of data should be added. For instance, to enable the number 4 to be output as a piece of output data when piece of input data 3 in FIG. 3 (i.e., image showing the number 4) is input, a piece of data including an image that shows the number 4 or 7 and that differs from piece of input data 3 may be added to the training dataset. However, it is difficult to determine specifically what kind of image should be added.

In a case in which recognizer 10 made false recognition as described above, the information processing system in Embodiment is capable of efficiently improving the accuracy of recognition by recognizer 10 by appropriately determining what kind of data should be added to the training dataset to prevent recognizer 10 from making such false recognition in the future.

Hereinafter, the processing system in Embodiment is described.

Examples of the configuration of the processing system in Embodiment are described.

Figure 4:
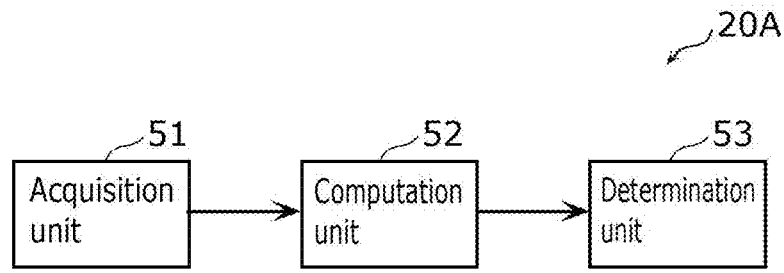
FIG. 4 is a block diagram illustrating a first example of the configuration of a processing system in Embodiment.

FIG. 4 is a block diagram illustrating a first example of the configuration of the processing system in Embodiment.

As illustrated in FIG. 4, processing system 20A includes acquisition unit 51, computation unit 52, and determination unit 53.

By means of a computer, acquisition unit 51 obtains a piece of first data and a piece of second data, the piece of second data being not included in the training dataset used for training the inferencer.

By means of the computer, computation unit 52 calculates a first contribution and a second contribution in the following manner. (a) Computation unit 52 calculates, by using a piece of first relevant data, the first contribution representing the respective contributions of portions constituting the piece of first data to a piece of first output data output by inputting the piece of first data to the inferencer, the piece of first relevant data being obtained by inputting the piece of first data to the inferencer trained by machine learning. (b) Computation unit 52 calculates the second contribution, by using a piece of second relevant data, the second contribution representing the respective contributions of portions constituting the piece of second data to a piece of second output data output by inputting the piece of second data to the inferencer, the piece of second relevant data being obtained by inputting the piece of second data to the inferencer.

According to the degree of similarity between the first contribution and the second contribution, determination unit 53 determines, by means of the computer, whether to add the piece of second data to the training dataset for the inferencer.

Next, the processing system in Embodiment is described in more detail.

Figure 5:
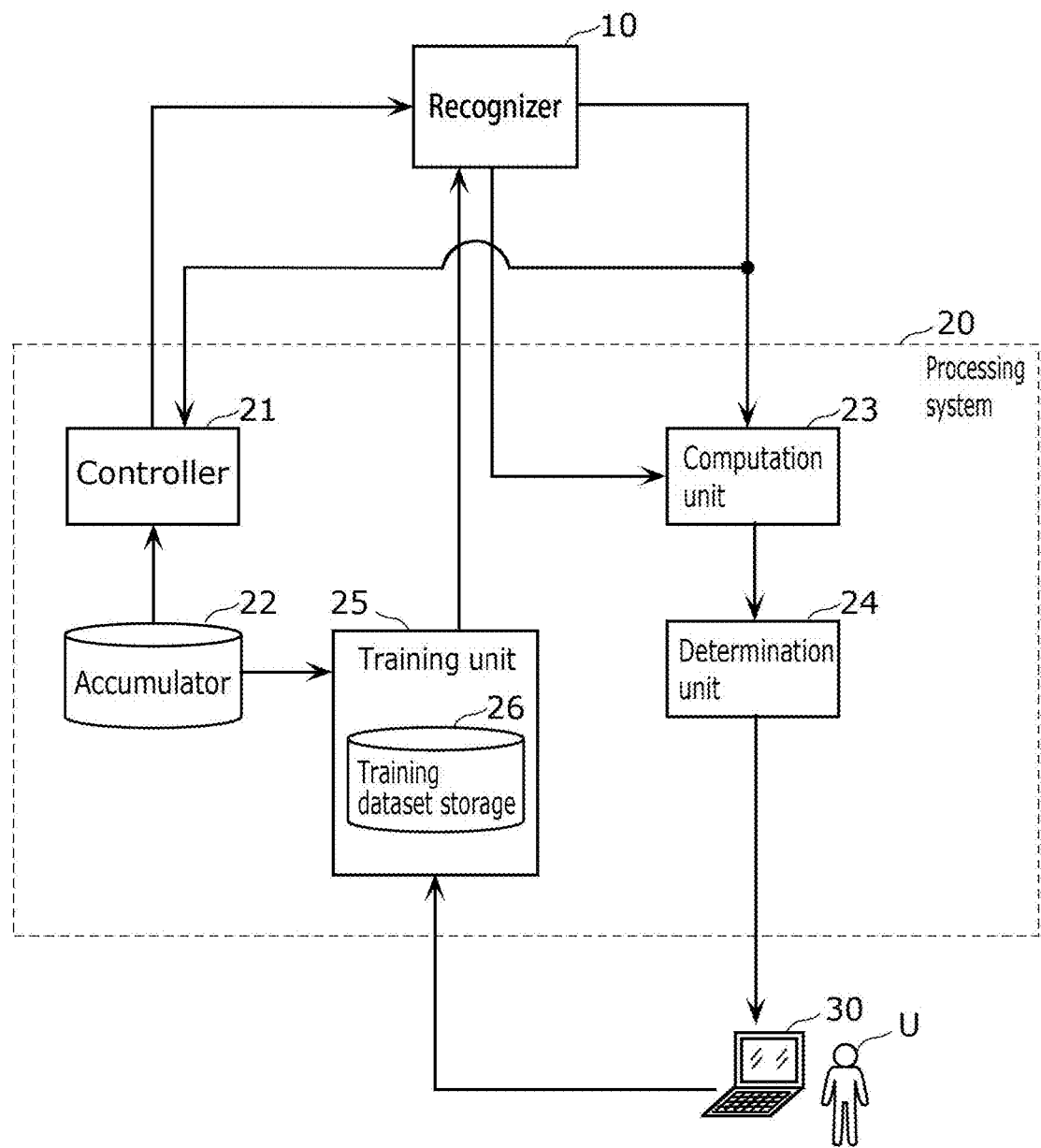
FIG. 5 is a block diagram illustrating a second example of the configuration of the processing system in Embodiment.

FIG. 5 is a block diagram illustrating a second example of the configuration of the processing system in Embodiment.

As illustrated in FIG. 5, processing system 20 includes controller 21, accumulator 22, computation unit 23, determination unit 24, and training unit 25. Processing system 20 is connected to recognizer 10, inputs a piece of data to recognizer 10, and receives a piece of data from recognizer 10. In addition, processing system is connected to management apparatus 30. Processing system may be, for instance, a computer.

Controller 21 is a processing unit that inputs a piece of input data to recognizer 10 and receives a piece of output data from recognizer 10.

Specifically, controller 21 inputs the piece of first data and the piece of second data to recognizer 10 by providing the pieces of data to at least recognizer 10. Here, the piece of first data is, for example, a piece of validation data. The piece of first data is a piece of data input to recognizer 10 and falsely recognized by recognizer 10. Hereinafter, the piece of first data is also referred to as a piece of falsely recognized data. Controller 21 obtains a piece of falsely recognized data, for example, in the following manner.

Controller 21 compares a number that is a piece of output data obtained by inputting, to recognizer 10, an image showing a given number (also referred to as a validation image) as a piece of input data and a number shown in the image, which is the piece of input data. If the numbers are not the same number, controller 21 determines that the piece of input data is a piece of data falsely recognized by recognizer 10, that is, a piece of falsely recognized data. Controller 21 obtains a piece of falsely recognized data in this manner.

In addition, the piece of second data is not included in the training dataset used for training recognizer 10 (in other words, training to generate recognizer 10). Controller 21 obtains images accumulated in accumulator 22 as pieces of second data. Since the pieces of second data are candidates that may be later added to the training dataset, the pieces of second data are also referred to as pieces of candidate data.

Accumulator 22 is a storage device in which images are accumulated. The images accumulated in accumulator 22 are not labeled. Controller 21 obtains the images accumulated in accumulator 22 as the pieces of second data.

It should be noted that each of the piece of first data and piece of second data is, for example, a piece of sensing data and, more specifically, a piece of image data obtained through sensing by a camera (by a camera capturing an image).

Computation unit 23 is a processing unit that calculates the respective contributions of portions constituting a piece of input data to a piece of output data output by recognizer 10 that has received the piece of input data. Specifically, by using a piece of first relevant data obtained by inputting a piece of first data to recognizer 10, computation unit 23 calculates a first contribution representing the respective contributions of portions constituting the piece of first data to a piece of output data output by recognizer 10 that has received the piece of first data. In addition, by using a piece of second relevant data obtained by inputting a piece of second data to recognizer 10, computation unit 23 calculates a second contribution representing the respective contributions of portions constituting the piece of second data to a piece of output data output by recognizer that has received the piece of second data.

Here, if the piece of first data is an image, the portions constituting the piece of first data correspond to the pixels that constitute the piece of first data. In addition, the respective contributions of portions constituting the piece of first data to the piece of first output data represent the respective amounts of contribution of pixels constituting the piece of first data to recognition of a number, that is, the result of recognition of the piece of first data by recognizer 10. Numerical values derived from the amounts of contribution are referred to as the degrees of contribution. The same applies to the portions constituting the piece of second data and the respective contributions of portions constituting the piece of second data to the piece of second output data.

It should be noted that a specific example of the piece of first relevant data is the piece of first output data, and a specific example of the piece of second relevant data is the piece of second output data. In addition, the piece of first relevant data (piece of second relevant data) may be output by the intermediate layer of the inferencer that has received the piece of first data (piece of second data). The intermediate layer may be a layer close to a final layer (or output layer).

Determination unit 24 is a processing unit and determines whether to add the piece of second data to the training dataset for recognizer 10, according to the degree of similarity between the first contribution and second contribution, which have been calculated by computation unit 23. When determining that the piece of second data should be added to the training dataset, determination unit 24 provides information indicating the piece of second data to management apparatus 30.

Training unit 25 is a processing unit for generating recognizer 10. Training unit 25 includes training dataset storage 26 and generates recognizer 10 by machine learning using the training dataset stored in training dataset storage 26. Specifically, recognizer 10 is generated by adjusting the internal parameters so that when receiving, as a piece of input data, an image of the training dataset stored in training dataset storage 26, recognizer 10 outputs, as a piece of output data, a numerical value indicated by a label appended to the image on the training dataset.

In addition, training unit 25 adds a new piece of training data (also referred to as a piece of additional data) to training dataset storage 26. Training unit 25 receives an instruction to add a piece of additional data (also referred to as an addition instruction) from management apparatus 30. The addition instruction includes a label that is a number shown in a piece of second data and information indicating the piece of second data. Training unit 25 receives the piece of second data from accumulator 22 according to the information included in the addition instruction and pairs the received piece of second data and the label included in the addition instruction. Training unit 25 then adds the piece of second data paired with the label to the training dataset. When determination unit 24 made a determination to add the piece of second data, a new piece of training data is added. Then, training unit 25 trains recognizer 10 by using a training dataset stored in training dataset storage 26 to which the new piece of training data has been added.

When the information indicating the piece of second data is provided by determination unit 24, management apparatus 30 presents the information to user U. Here, management apparatus corresponds to a presentation apparatus. User U identifies the number shown in the piece of second data according to the presented information and inputs the identified number to management apparatus 30 as a label.

Management apparatus 30 receives, from user U, the label indicating the number included in the piece of second data.

Management apparatus 30 transmits, to training unit 25, the addition instruction including the label and the information indicating the piece of second data. By receiving the addition instruction from management apparatus 30, training unit 25 generates a training dataset.

Figures 6, 7:
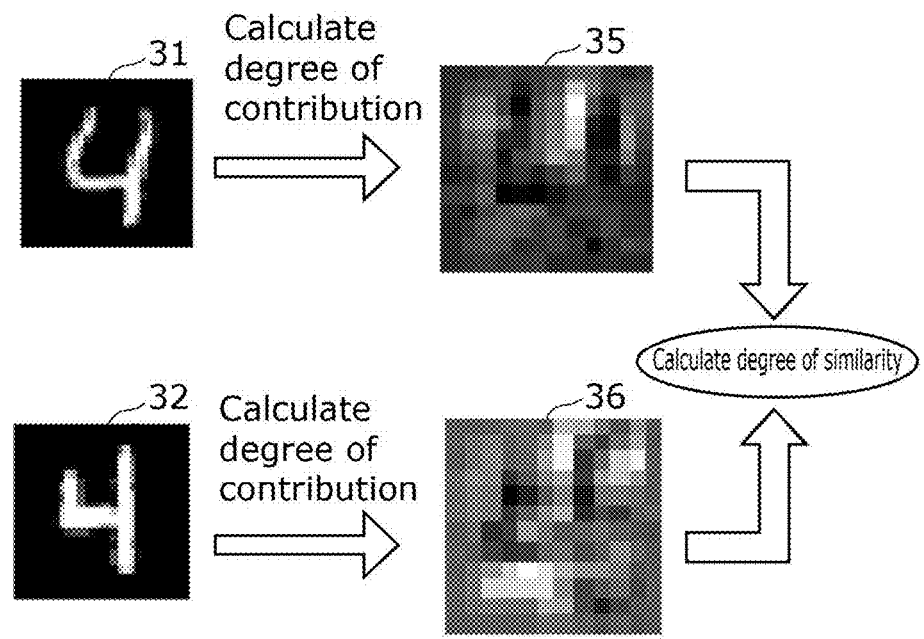
FIG. 6 illustrates specifically how a computation unit in Embodiment calculates the degrees of contribution and the degree of similarity.
FIG. 7 illustrates a first example of an additional data determination method implemented by a determination unit in Embodiment.

FIG. 6 illustrates specifically how computation unit 23 in Embodiment calculates the degrees of contribution and the degree of similarity.

Image 31 in FIG. 6 is an example of a piece of input data input to recognizer 10 and, for example, a piece of data falsely recognized by recognizer 10. That is, although image 31 shows the number 4, recognizer 10 identified the number shown in image 31 as the number 7, which is different from the number 4.

Computation unit 23 obtains a piece of relevant data, which is obtained by inputting image 31 to recognizer 10. The piece of relevant data is a piece of output data output by recognizer 10. Computation unit 23 calculates degree of contribution 35 according to the piece of relevant data. Degree of contribution 35 represents the respective degrees of contribution of portions constituting the piece of input data to the piece of output data. For instance, degree of contribution 35 represents the respective degrees of contribution of pixels constituting image 31 to the fact that recognizer 10 identified the number shown in image 31 as a predetermined number. It should be noted that the predetermined number may be the number 7 output by recognizer 10 as the piece of output data or the number 4 shown in the piece of input data. Degree of contribution is shown in gray-scale representation. Pixels having the highest degree of contribution are shown in white, and pixels having the lowest degree of contribution are shown in black. Regarding the gray pixels, the closer to white, the higher the degree of contribution.

Image 32 in FIG. 6 is an example of a piece of input data input to recognizer 10 and an example of an image stored in accumulator 22 but not included in the training dataset. Image 32, which shows the number 4, is not labeled.

Computation unit 23 obtains a piece of relevant data, which is obtained by inputting image 32 to recognizer 10. Then, computation unit 23 calculates degree of contribution 36 according to the piece of relevant data. The piece of relevant data is also a piece of output data output by recognizer 10. For instance, degree of contribution 36 represents the respective degrees of contribution of pixels constituting image 32 to the fact that recognizer 10 identified the number shown in image 32 as a predetermined number. It should be noted that the preceding predetermined number is the same as the predetermined number used when recognizer 10 received image 31 and outputted the piece of relevant data.

Computation unit 23 calculates the degree of similarity between degree of contribution 35 and degree of contribution 36. The degree of similarity is calculated by a known art. As a specific example, by performing pooling, degree of contribution 35 and degree of contribution 36 are changed into vectors of a fixed dimension. Then, an inner product or cosine distance is obtained by using the vectors of the fixed dimension. In this way, the degree of similarity is calculated. It should be noted that in order to represent the degree of similarity within a predetermined numerical range, computation unit 23 may change a numerical range by performing an appropriate operation. Here, the degree of similarity is shown on an integer scale of 1 to 10. Degree of similarity 1 denotes the lowest degree of similarity, and degree of similarity 10 denotes the highest degree of similarity.

FIG. 7 illustrates a first example of an additional data determination method implemented by determination unit 24 in Embodiment. FIG. 7 illustrates a method of determining which of images P, Q, R, and S stored in accumulator 22 should be added to the training dataset if, as an example, one piece of falsely recognized data is present.

Computation unit 23 calculates the degrees of similarity between the degree of contribution of the piece of falsely recognized data and the degrees of contribution of images P, Q, R, and S, which are pieces of candidate data stored in accumulator 22. Here, the degrees of similarity to the degrees of contribution of images P, Q, R, and S are the numbers 6, 7, 5, and 1, respectively (see (a) in FIG. 7).

When determining whether to add a piece of candidate data to the training dataset, determination unit 24 determines whether to add to enable a piece of candidate data more similar to the piece of falsely recognized data in terms of the contribution to be more preferentially selected from the pieces of candidate data stored in accumulator 22 and added to the training dataset.

For instance, determination unit 24 assigns degree of priority 1, degree of priority 2, and the following degrees of priority to pieces of data in descending order of the degree of similarity in terms of the degree of contribution. Here, the smaller the numerical vale of the degree of priority, the higher the precedence. Specifically, determination unit 24 assigns degree of priority 1 to image Q having the highest degree of similarity of 7 and degree of priority 2 to image P having the next highest degree of similarity of 6. In the same way, determination unit 24 assigns degree of priority 3 and degree of priority 4 to image R and image S, respectively.

Determination unit 24 then selects a predetermined number of images in descending order of the degree of similarity, that is, in ascending order of the numerical value of the degree of priority and adds the selected images to the training dataset. For instance, when two images are added to the training dataset, determination unit 24 determines that image Q having degree of priority 1 and image P having degree of priority 2 will be added to the training dataset and used as pieces of training data. Determination unit 24 also determines that images R and S will not be added to the training dataset.

It should be noted that if pieces of falsely recognized data are present, images to be added to the training dataset are determined according to pieces of falsely recognized data.

Two examples are described below regarding the additional data determination method in this case.

(1) Example that Uses Degrees of Similarity to all Pieces of Candidate Data

FIG. 8 illustrates a second example of the additional data determination method implemented by determination unit 24 in Embodiment.

FIG. 8 illustrates a method of determining which of images P, Q, R, and S, which are pieces of candidate data stored in accumulator 22, should be added to the training dataset if, as an example, three pieces of falsely recognized data: piece of data A, piece of data B, and piece of data C are present.

Computation unit 23 calculates the degrees of similarity between the degrees of contribution of piece of data A, piece of data B, and piece of data C, which are three pieces of falsely recognized data, and the degrees of contribution of images P, Q, R, and S, which are pieces of candidate data stored in accumulator 22. Here, the degrees of similarity between the degree of contribution of piece of falsely recognized data A and the degrees of contribution of images P, Q, R, and S are the numbers 6, 7, 5, and 1, respectively. The degrees of similarity between the degree of contribution of piece of falsely recognized data B and the degrees of contribution of images P, Q, R, and S are the numbers 2, 2, 3, and 4, respectively. The degrees of similarity between the degree of contribution of piece of falsely recognized data C and the degrees of contribution of images P, Q, R, and S are the numbers 1, 3, 1, and 3, respectively (see FIG. 8).

Determination unit 24 calculates a plurality of degrees of contribution including the degree of contribution of each of pieces of falsely recognized data. According to a representative value calculated from a plurality of degrees of similarity including the degrees of similarity between the calculated plurality of degrees of contribution and the degree of contribution of a piece of candidate data, determination unit 24 determines whether to add the piece of candidate data to the training dataset.

For instance, the greatest value among the degrees of similarity can be used as a representative value in terms of the degree of similarity. In the example illustrated in FIG. 8, the degrees of similarity between the degrees of contribution of piece of data A, piece of data B, and piece of data C, which are pieces of falsely recognized data, and the degree of contribution of image P are the numbers 6, 2, and 1, respectively. Thus, the representative value in terms of the degree of similarity for image P is the number 6, which is the greatest value among the numbers 6, 2, and 1. Similarly, representative values in terms of the degree of similarity for images Q, R, and S are the numbers 7, 5, and 4, respectively.

Determination unit 24 then determines that a predetermined number of data selected in descending order of representative value in terms of the degree of similarity will be added to the training dataset. The processing of selecting data to be added to the training dataset is the same as the processing described in the case in which one piece of falsely recognized data is present (see FIG. 7). Thus, an explanation for the processing is omitted.

It should be noted that a mean value among the degrees of similarity may be used as a representative value among the degrees of similarity.

Thus, in a case in which pieces of falsely recognized data are present, which image should be added to the training dataset can be determined using the degrees of similarity to all the candidate data.

(2) Example that Uses, for Each Piece of Falsely Recognized Data, Degrees of Similarity to Predetermined Number of Pieces of Candidate Data FIG. 9 is a third example of the additional data determination method implemented by determination unit 24 in Embodiment.

FIG. 9 illustrates a method of using a predetermined number of pieces of candidate data for each piece of falsely recognized data after the degrees of similarity illustrated in FIG. 8 are calculated.

Here, the plurality of degrees of similarity include the degrees of similarity between first contributions and second contributions including the second contribution of each of the pieces of second data.

Regarding the calculation of the representative value, determination unit 24 selects, for each of the pieces of first data, a predetermined number of degrees of similarity from the plurality of degrees of similarity and calculates a representative value for each of the pieces of second data, by using the selected predetermined number of degrees of similarity. Regarding the determination of whether to add the piece of second data to the training dataset, determination unit 24 determines whether to add the piece of second data to the training dataset according to the calculated representative values.

For instance, if the predetermined number is two, determination unit 24 selects two degrees of similarity for each of pieces of falsely recognized data A, B, and C. Regarding the method of selecting the two degrees of similarity, for instance, a method of preferentially selecting a piece of data having a higher degree of similarity may be employed. Although the foregoing selecting method is described hereinafter, another selecting method may be employed.

Regarding piece of falsely recognized data A, determination unit 24 selects a degree of similarity of 7 (similarity to image Q) and a degree of similarity of 6 (similarity to image P) as two relatively high degrees of similarity. Here, N/A is assigned to images R and S, which are pieces of data not selected (see FIG. 9). N/A means that the degree of similarity is not taken into account.

Similarly, regarding piece of falsely recognized data B, determination unit 24 selects a degree of similarity of 4 (similarity to image S) and a degree of similarity of 3 (similarity to image R) as two relatively high degrees of similarity. In addition, regarding piece of falsely recognized data C, determination unit 24 selects a degree of similarity of 3 (similarity to image Q) and a degree of similarity of 3 (similarity to image S) as two relatively high degrees of similarity.

Determination unit 24 then calculates representative values in terms of the degree of similarity, by using the degrees of similarity determined as described above. Specifically, without taking into account the not-selected data, that is, the data to which N/A is assigned, determination unit 24 determines that the representative values in terms of the degree of similarity for images P, Q, R, and S are the numbers 6, 7, 3, and 4, respectively.

Determination unit 24 adds, to the training dataset, a predetermined number of data selected in descending order of representative value in terms of the degree of similarity. The processing of selecting data to be added to the training dataset is the same as the processing described in the case in which one piece of falsely recognized data is present (FIG. 7). Thus, an explanation for the processing is omitted.

Thus, it is possible to suppress determination unit 24 from determining that pieces of candidate data similar exclusively to a specific piece of falsely recognized data in terms of the degree of contribution will be added to the training dataset. Depending on the degrees of similarity between the pieces of falsely recognized data and images P, Q, R, and S accumulated in accumulator 22, pieces of candidate data similar exclusively to piece of falsely recognized data A among pieces of falsely recognized data A, B, and C in terms of the contribution, may be added to the training dataset (see FIG. 8). In this case, while it is possible to suppress another false inference from being made for images similar to piece of falsely recognized data A, it may not be possible to suppress another false inference from being made for images similar to pieces of falsely recognized data B and C. Thus, as described above, by calculating representative values in terms of the degree of similarity without taking into account the not-selected data, it is possible to suppress a false inference from being made, evenly among pieces of falsely recognized data A, B, and C.

Next, a processing method implemented by the processing system having the above configuration, that is, an information processing method is described.

Figure 10:
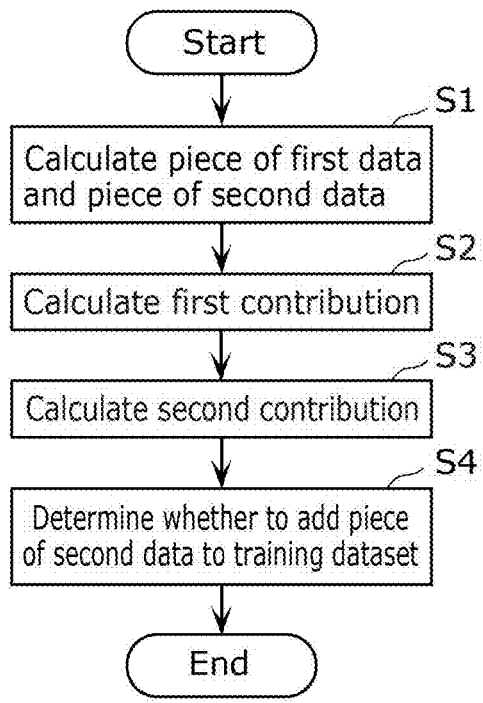
FIG. 10 is a flowchart illustrating a first example of processing performed by the processing system in Embodiment.

FIG. 10 is a flowchart illustrating a first example of processing performed by the processing system in Embodiment.

The processing illustrated in FIG. 10 is an information processing method implemented by a computer.

As illustrated in FIG. 10, in step S1, a piece of first data and a piece of second data are obtained, the piece of second data being not included in the training dataset used for training the inferencer.

In step S2, a first contribution representing the respective contributions of portions constituting the piece of first data to a piece of first output data output by inputting the piece of first data to the inferencer is calculated by using a piece of first relevant data obtained by inputting the piece of first data to the inferencer trained by machine learning.

In step S3, a second contribution representing the respective contributions of portions constituting the piece of second data to a piece of second output data output by inputting the piece of second data to the inferencer is calculated by using a piece of second relevant data obtained by inputting the piece of second data to the inferencer.

In step S4, whether to add the piece of second data to the training dataset for the inferencer is determined according to the degree of similarity between the first contribution and the second contribution.

Figure 11:
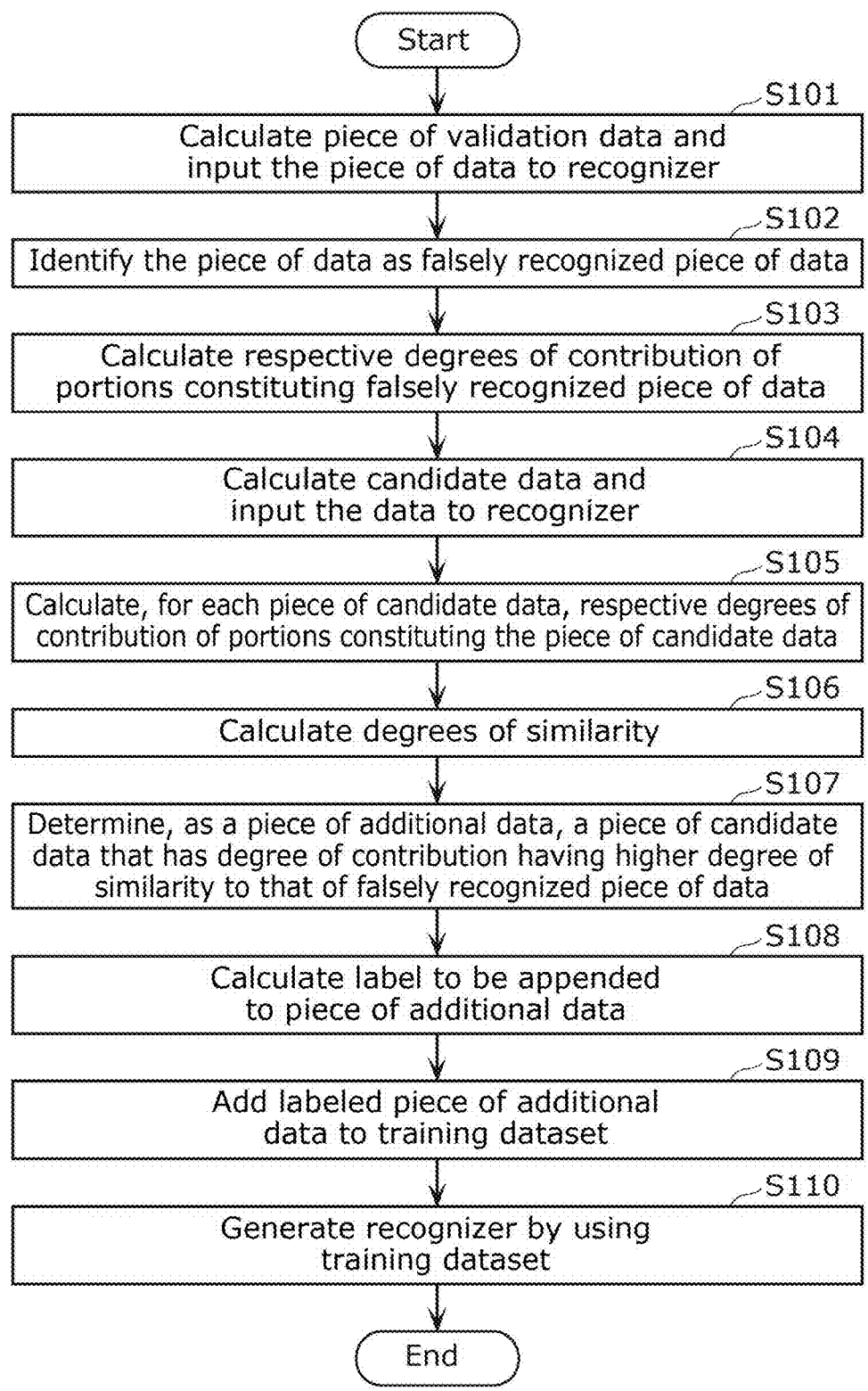
FIG. 11 is a flowchart illustrating a second example of the processing performed by the processing system in Embodiment.

FIG. 11 is a flowchart illustrating the processing performed by the processing system in Embodiment.

In step S101, controller 21 obtains a piece of validation data, inputs the piece of obtained validation data to recognizer 10 as a piece of input data, and obtains a piece of output data. In addition, computation unit 23 obtains a piece of relevant data, which is obtained by inputting the piece of input data to recognizer 10.

In step S102, controller 21 determines whether the piece of output data obtained in step S101 matches a label appended to the piece of validation data. If it is determined that the piece of output data and the label do not match, controller 21 identifies the piece of validation data input to recognizer 10 in step S101 as a piece of falsely recognized data.

In step S103, regarding the piece of data identified as a piece of falsely recognized data in step S102, computation unit 23 calculates the respective degrees of contribution of portions constituting the piece of input data to the piece of output data obtained in step S101, by using the piece of relevant data obtained in step S101.

In step S104, controller 21 obtains data accumulated in accumulator 22 as pieces of candidate data, inputs the obtained pieces of candidate data to recognizer 10 as pieces of input data, and obtains pieces of output data. In addition, computation unit 23 obtains pieces of relevant data, which are obtained by inputting the pieces of input data to recognizer 10.

In step S105, regarding each of the pieces of candidate data input to recognizer 10 in step S104, computation unit 23 calculates the respective degrees of contribution of portions constituting the piece of input data to the corresponding piece of output data obtained in step S104, by using the corresponding piece of relevant data obtained in step S104.

In step S106, computation unit 23 calculates the degrees of similarity between the degrees of contribution calculated in step S103 and the degrees of contribution calculated in step S104.

In step S107, determination unit 24 selects, from the pieces of candidate data, a piece of candidate data that has a degree of contribution having a higher degree of similarity to that of the piece of falsely recognized data and determines the piece of candidate data as a piece of additional data. Determination unit 24 transmits information indicating the determined piece of additional data to management apparatus 30, which then presents the information to user U. User U refers to the piece of additional data and inputs, to management apparatus 30, a label to be appended to the piece of additional data. Management apparatus 30 provides the input label to training unit 25 by, for example, transmitting the input label to training unit 25 through a communication line.

In step S108, training unit 25 obtains the label to be appended to the piece of additional data from management apparatus 30 by, for example, receiving the label through the communication line.

In step S109, training unit 25 adds the labeled piece of additional data to the training dataset.

In step S110, training unit 25 generates recognizer 10 by machine learning that uses a training dataset including the piece of additional data added in step S109. After step S110 is performed, the processing illustrated in FIG. 11 ends.

By performing the processing, the processing system can efficiently improve the accuracy of recognition by recognizer 10.

[Variation 1]

In Variation 1, regarding an information processing method that enables efficient improvement in the accuracy of inference by an inferencer, a technique capable of improving the performance of recognizer 10 to at least a predetermined level is described.

The configuration of a processing system according to Variation 1 is the same as that of processing system 20 in Embodiment (see FIG. 5).

Portions different between processing performed by the processing system according to Variation 1 and the processing performed by processing system 20 in Embodiment are described below. It should be noted that in the processing performed by the processing system according to Variation 1, steps identical to those (see FIG. 11) performed by processing system 20 in Embodiment are assigned the same reference symbols, and detailed explanations are omitted.

Figure 12:
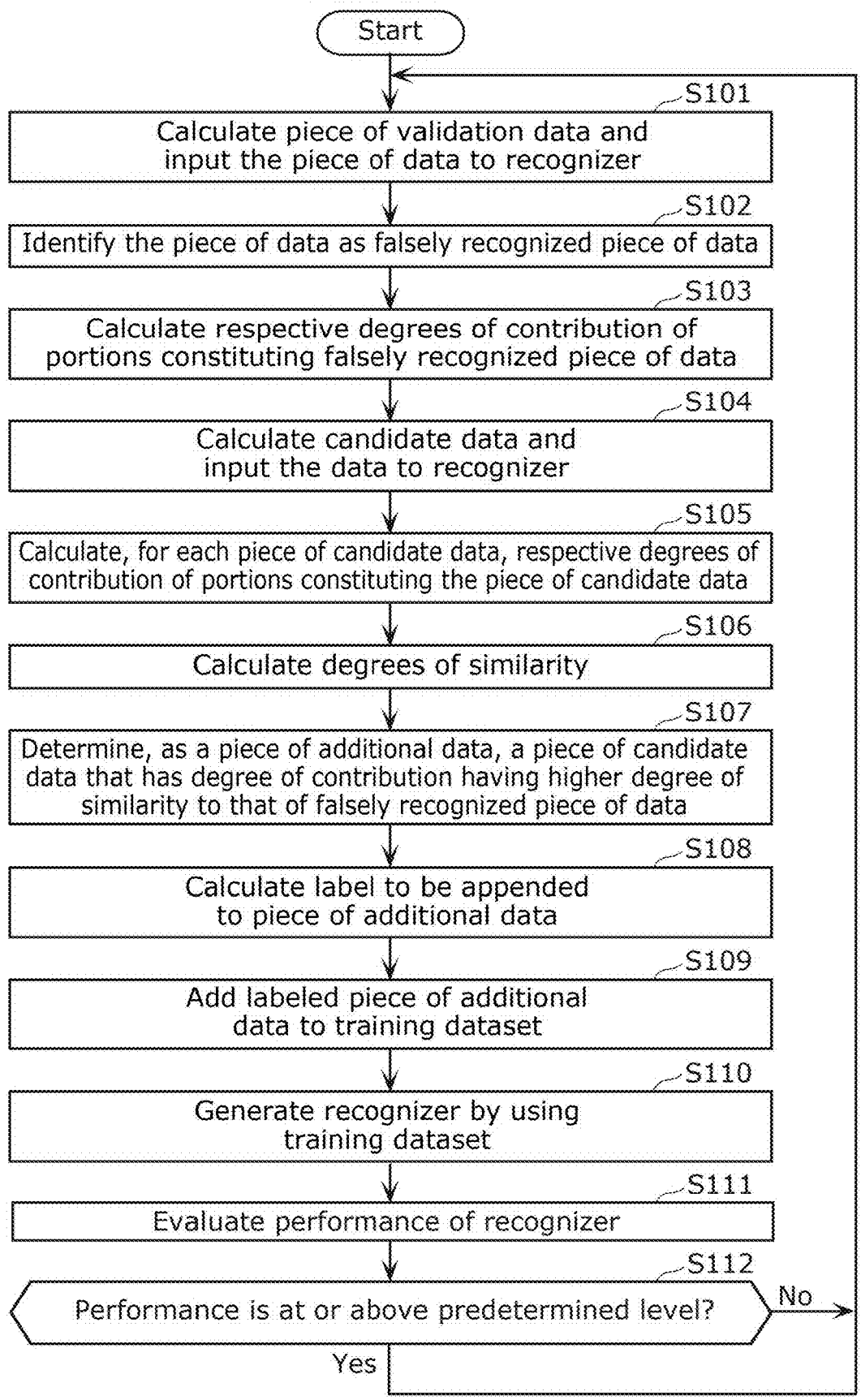
FIG. 12 is a flowchart illustrating processing performed by a processing system in Variation 1 of Embodiment.

FIG. 12 is a flowchart illustrating processing performed by the processing system in Variation 1.

Steps S101 to S110 in FIG. 12 are the same as those illustrated in FIG. 11.

In step S111, controller 21 evaluates the performance of recognizer 10 generated in step S110. When evaluating the performance, controller 21 inputs pieces of validation data to recognizer 10 as pieces of input data and obtains pieces of output data. The percentage that a label appended in advance to a piece of validation data matches a piece of output data is calculated as the value of performance. For instance, let's assume that 100 pieces of validation data are input. In 95 of the 100 pieces of validation data, labels match pieces of output data, and in five of the 100 pieces of validation data, labels do not match pieces of output data. In this case, the value of performance is 95%.

In step S112, controller 21 determines whether the performance evaluated in step S111 is at or above the predetermined level. Specifically, controller 21 compares the value of performance calculated in step S111 and a predetermined value (e.g., 90%). If it is determined that the value of performance is greater than or equal to the predetermined value, controller 21 determines that the performance is at or above the predetermined level. If it is determined that the performance of recognizer 10 is at or above the predetermined level (Yes in S112), the processing illustrated in FIG. 12 ends. Otherwise (No in step S112), step S101 is performed again.

In this way, training data are added until the performance of recognizer 10 is at or above the predetermined level. Thus, the performance of recognizer 10 can be improved to at least the predetermined level.

It should be noted that if the determination that the value of performance is not at or above the predetermined value has been made a predetermined number of times or more in step S112, the processing may be discontinued without performing step S101. In this case, an error message indicating the discontinuation of the processing may be presented.

By performing the above processing, the processing system can improve the performance of the recognizer to at least the predetermined level, when efficiently improving the accuracy of recognition by the recognizer.

[Variation 2]

In Variation 2, regarding an information processing method that enables efficient improvement in the accuracy of inference by an inferencer, a technique of repeating the processing of improving the accuracy of inference is described.

Figure 13:
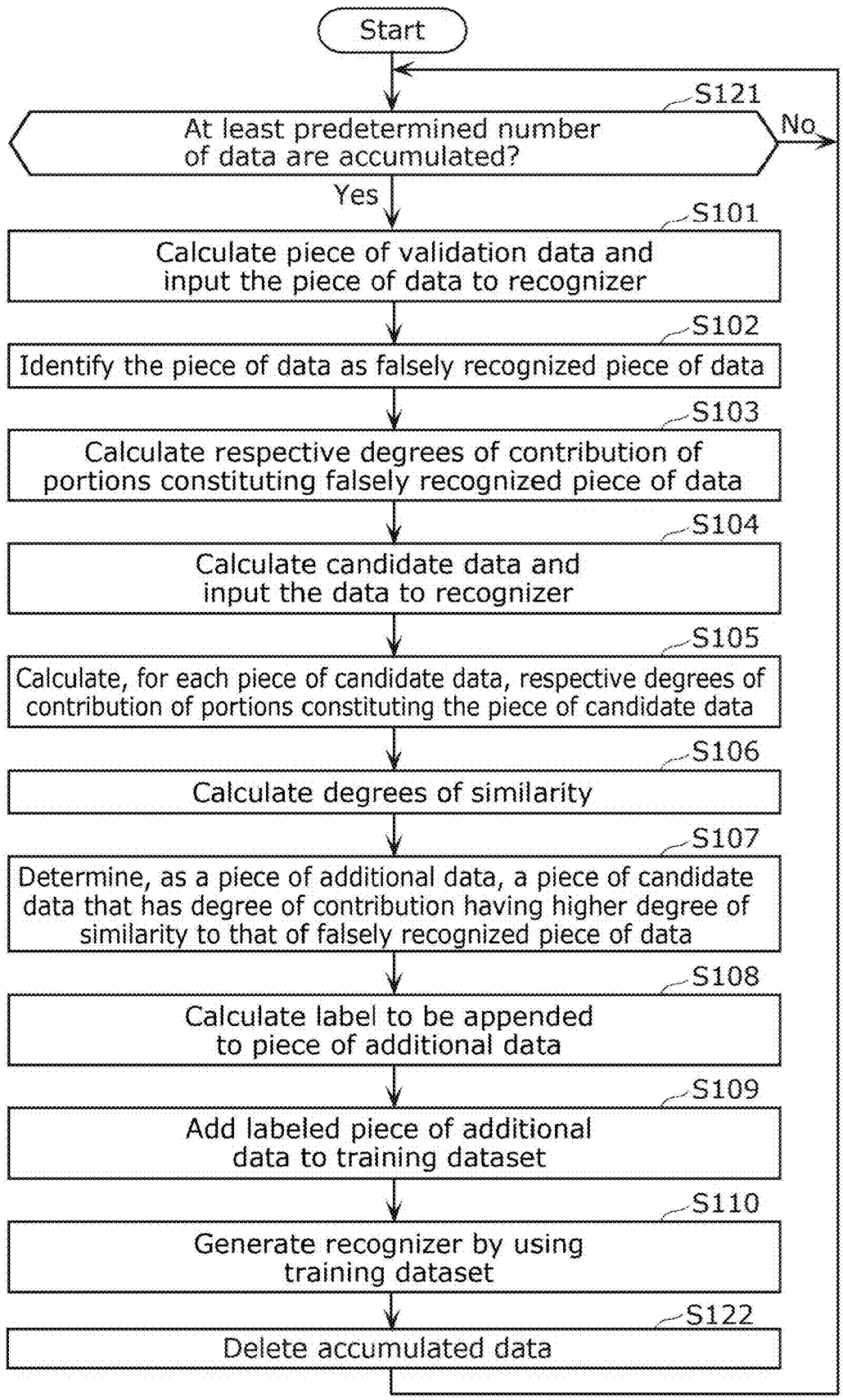
FIG. 13 is a flowchart illustrating processing performed by a processing system in Variation 2 of Embodiment.

FIG. 13 is a flowchart illustrating processing performed by a processing system in Variation 2.

The configuration of the processing system according to Variation 2 is the same as that of processing system 20 in Embodiment (see FIG. 5).

Portions different between the processing performed by the processing system according to Variation 2 and the processing performed by processing system 20 in Embodiment are described below. It should be noted that in the processing performed by the processing system according to Variation 2, steps identical to those (see FIG. 11) performed by processing system 20 in Embodiment are assigned the same reference symbols, and detailed explanations are omitted.

FIG. 13 is a flowchart illustrating the processing performed by the processing system in Variation 2.

Here, new images are repeatedly added to and accumulated in accumulator 22. For instance, images obtained through sensing at intervals of minutes by an in-vehicle camera are received through a communication line and accumulated in accumulator 22.

In step S121, controller 21 determines whether at least a predetermined number of data are accumulated in accumulator 22. If controller 21 determines that at least a predetermined number of data are accumulated (Yes in step S121), step S122 is performed. Otherwise (No in step S121), step S121 is performed again. That is, until a predetermined number of data are accumulated in accumulator 22, the processing performed by controller 21 does not proceed from step S121. It should be noted that the predetermined number is, for example, around 1000.

Steps S101 to S110 in FIG. 13 are the same as those illustrated in FIG. 11.

In step S122, controller 21 deletes the data accumulated in accumulator 22.

After step S122, controller 21 performs step S121 again. In this way, in the situation in which equipment other than accumulator 22 accumulates data in accumulator 22, every time at least a predetermined number of data are accumulated in accumulator 22, processing system 20 performs steps S101 to S110 to add additional data to the training dataset.

By performing the above processing, the processing system can repeatedly improve the accuracy of recognition, when efficiently improving the accuracy of recognition by the recognizer.

Thus, in the information processing methods described in Embodiment and Variations 1 and 2, it is determined that a piece of second data having a contribution similar to that of a piece of first data will be added to the training dataset. The contribution represents an effect on the result of inference (processing performed) by the inferencer. Thus, a piece of second data similar to a piece of first data in terms of the effect on the result of inference by the inferencer can be selected. By training the inferencer by using the selected piece of second data as a piece of training data, it is more likely to suppress the inferencer from making a false inference for the piece of first data and pieces of data similar to the piece of first data. In addition, by adding a piece of data useful for the inferencer to the training dataset, it is possible to avoid randomly adding a vast amount of data. Hence, according to the above-described aspect, the accuracy of inference by the inferencer can be efficiently improved.

In addition, it is determined that a piece of second data having a contribution similar to that of a piece of falsely inferred data will be added to the training dataset. By training the inferencer by using a training dataset to which the piece of second data has been added in accordance with the determination, it is possible to suppress the inferencer from making another false inference for pieces of data similar to the piece of falsely inferred data. Hence, according to the above-described aspect, the accuracy of inference by the inferencer can be efficiently improved.

The inferencer is trained using the training dataset to which the piece of second data has been added in accordance with the determination that the piece of second data will be added to the training dataset. This makes it possible to suppress the inferencer from making another false inference for pieces of data similar to the piece of first data. Hence, according to the above-described aspect, the accuracy of inference by the inferencer can be efficiently improved.

In addition, the following determination can be made: a piece of second data more similar to the piece of first data in terms of the contribution is selected from the prepared pieces of second data, and the selected piece of second data is added to the training dataset. Hence, according to the above-described aspect, the accuracy of inference by the inferencer can be more efficiently improved.

In addition, if pieces of first data are present, a piece of second data to be added to the training dataset is determined using representative values calculated from the degrees of similarity calculated for each of the pieces of first data. If pieces of first data are present, a plurality of degrees of similarity are calculated. However, it is difficult to determine, by using the plurality of degrees of similarity, which piece of second data should be added to the training dataset. Thus, by using the representative values calculated from the plurality of degrees of similarity, it is possible to readily determine which piece of second data should be added to the training dataset. Hence, according to the above-described aspect, the accuracy of inference by the inferencer can be readily improved.

If pieces of first data are present, it is possible to suppress the determination that pieces of second data similar exclusively to a specific piece of first data in terms of the contribution will be added to the training dataset, from being made. If pieces of first data are present, in some cases, it is determined that pieces of second data similar exclusively to a specific piece of first data in terms of the contribution will be added to the training dataset. In this case, while it is possible to suppress the inferencer from making another false inference for pieces of data similar to the specific piece of first data, it may not be possible to suppress the inferencer from making another false inference for the pieces of first data other than the specific piece of first data among the pieces of first data. Thus, it may not be possible to suppress the inferencer from making a false inference, evenly among the pieces of first data. According to the above-described aspect, however, it is possible to suppress the inferencer from making a false inference, evenly among the pieces of first data. Hence, according to the above-described aspect, the accuracy of inference by the inferencer can be efficiently improved, and improvements can be made evenly among the pieces of first data.

In addition, it is possible to suppress false identification in identification processing performed by the identifier or false detection in detection processing performed by the detector. Hence, according to the above-described aspect, the accuracy of identification by the identifier or the accuracy of detection by the detector can be efficiently improved.

In addition, it is possible to efficiently improve the accuracy of inference for the piece of sensing data.

In addition, efficient improvement in the accuracy of inference by the inferencer can be more readily made by using the piece of first output data as the piece of first relevant data.

In addition, information indicating the piece of second data determined to be added to the training dataset is presented. The presentation apparatus presents the piece of second data to a user according to the information and receives, from the user, a label regarding the information indicating the piece of second data. The data is added to the training dataset by using the input label. Hence, by receiving, from the user, the label for the data to be added, the accuracy of inference by the inferencer can be more efficiently improved.

It should be noted that in Embodiment and Variations 1 and 2, each structural element may be dedicated hardware or be caused to function by running a software program suitable for the structural element. To cause each structural element to function, a program running unit, such as a CUP or processor, may read and run a software program stored in a recording medium, such as a hard disk or semiconductor memory. Here, by running a program described below, the processing systems described in Embodiment and Variations 1 and 2 are caused to function.

The program is an information processing method implemented by a computer. By running the program, the computer implements the information processing method. The information processing method includes: obtaining a piece of first data and a piece of second data, the piece of second data being not included in a training dataset used for training an inferencer; calculating, by using a piece of first relevant data, a first contribution representing the respective contributions of portions constituting the piece of first data to a piece of first output data output by inputting the piece of first data to the inferencer, the piece of first relevant data being obtained by inputting the piece of first data to the inferencer trained by machine learning using the training dataset; calculating, by using a piece of second relevant data, a second contribution representing the respective contributions of portions constituting the piece of second data to a piece of second output data output by inputting the piece of second data to the inferencer, the piece of second relevant data being obtained by inputting the piece of second data to the inferencer; and determining whether to add the piece of second data to the training dataset for the inferencer, according to the degree of similarity between the first contribution and the second contribution.

Although a processing system according to one or more than one embodiment is described on the basis of Embodiment, the present disclosure is not limited to the descriptions in Embodiment. Without departing from the spirit of the present disclosure, one or more than one embodiment may cover an embodiment obtained by making various changes envisioned by those skilled in the art to the above embodiment or an embodiment obtained by combining structural elements described in different embodiments.

INDUSTRIAL APPLICABILITY

The present disclosure is applicable to a processing system capable of efficiently improving the accuracy of inference by an inferencer.

The invention claimed is:
1. An information processing method implemented by a computer, the information processing method comprising:
obtaining first image data and first label information for use in evaluating a neural network that outputs output data including a recognition result indicating a recognition object recognized from input image data, the first image data including a first object whose image has been captured by a first camera, the first label information being information indicating the first object, the neural network being trained by machine learning using pieces of training image data;
obtaining first output data as the output data from the neural network, the first output data including a first recognition result indicating a first recognition object recognized from the first image data by the neural network as a result of inputting the first image data as the input image data into the neural network;
selecting the first image data as falsely recognized image data, when the first recognition object indicated by the first output data obtained does not match the first object indicated by the first label information;
calculating a first contribution representing degrees of contribution of respective pixels to recognition from the first image data by the neural network, the respective pixels being included in the first image data selected as the falsely recognized image data;
obtaining second image data to be a candidate for a new piece of training image data for use in training the neural network, the second image data including a
second object whose image has been captured by a
second camera;

obtaining second output data as the output data from the
neural network, the second output data including a
second recognition result indicating a second recognition
object recognized from the second image data by
the neural network as a result of inputting the second
image data as the input image data into the neural
network;

calculating a second contribution representing degrees of
contribution of respective pixels to recognition from
the second image data by the neural network, the
respective pixels being included in the second image
data;

calculating a degree of similarity between the first contribution and the second contribution;

determining whether to add the second image data to the
pieces of training image data, in accordance with the
degree of similarity calculated; and training the neural network by using a new set of pieces
of training data obtained by adding, to the pieces of
training data, the second data determined to be added.

2. The information processing method according to claim 1, wherein the second image data obtained includes pieces
of second image data captured by the second camera, in the calculating of the second contribution, second
contributions corresponding to the pieces of second
image data are calculated, in the calculating of the degree of similarity, degrees of
similarity between the first contribution and the second
contributions are calculated, and in the determining, a piece of second image data, among
the pieces of second image data, that corresponds to a
second contribution used in calculation of a highest
degree of similarity among the degrees of similarity
calculated is determined to be preferentially added to
the pieces of training image data, compared with an
other piece of the pieces of second image data.

3. The information processing method according to claim 2, wherein the first image data obtained includes pieces of
first image data captured by the first camera, in the selecting, the first image data selected as the falsely
recognized image data includes two or more pieces of
first image data out of the pieces of first image data, in
the calculating of the first contribution, two or more
first contributions corresponding to the two or more
pieces of first image data are calculated, and whether to add each of the pieces of second image data to
the pieces of training image data is determined in
accordance with a representative value calculated using
degrees of similarity between the two or more first
contributions calculated and the second contributions.

4. The information processing method according to claim 3, wherein the representative value is calculated for each of
the pieces of second image data, the representative
value being based on a degree of similarity selected
from among degrees of similarity between the second
contribution in the piece of second image data and the
two or more first contributions.

5. The information processing method according to claim 1, wherein each of the first image data and the second image
data is image data captured by a camera.

6. The information processing method according to claim 1, wherein the first contribution is calculated based on data
output from an intermediate layer of the neural network
when the first image data is input into the neural
network, and the second contribution is calculated based on data output
from the intermediate layer when the second image
data is input into the neural network.

7. The information processing method according to claim 1, wherein a presentation apparatus presents information
indicating the second image data determined to be
added to the pieces of the training image data.

8. The information processing system according to claim 1, wherein the second camera is provided to a vehicle.

9. An information processing system, comprising:

a processor; and a memory in which a program is stored, wherein when executed by the processor, the program causes the
processor to perform:

obtaining first image data and first label information for
use in evaluating a neural network that outputs
output data including a recognition result indicating
a recognition object recognized from input image
data, the first image data including a first object
whose image has been captured by a first camera, the
first label information being information indicating
the first object, the neural network being trained by
machine learning using pieces of training image
data;

obtaining first output data as the output data from the
neural network, the first output data including a first
recognition result indicating a first recognition object
recognized from the first image data by the neural
network as a result of inputting the first image data
as the input image data into the neural network;

selecting the first image data as falsely recognized
image data, when the first recognition object indicated by the first output data obtained does not match
the first object indicated by the first label information;

calculating a first contribution representing degrees of
contribution of respective pixels to recognition from
the first image data by the neural network, the
respective pixels being included in the first image
data selected as the falsely recognized image data;

obtaining second image data to be a candidate for a new
piece of training image data for use in training the
neural network, the second image data including a
second object whose image has been captured by a
second camera;

obtaining second output data as the output data from
the neural network, the second output data including
a second recognition result indicating a second recognition object recognized from the second image
data by the neural network as a result of inputting the
second image data as the input image data into the
neural network;

calculating a second contribution representing degrees
of contribution of respective pixels to recognition
from the second image data by the neural network,
the respective pixels being included in the second
image data;

calculating a degree of similarity between the first
contribution and the second contribution;

determining whether to add the second image data to the pieces of training image data, in accordance with the degree of similarity calculated; and training the neural network by using a new set of pieces of training data obtained by adding, to the pieces of training data, the second data determined to be added.

* * * * *